United States Patent
Lartigue

(10) Patent No.: US 10,309,499 B2
(45) Date of Patent: Jun. 4, 2019

(54) DRIVE ROLLER

(71) Applicant: MESSIER-BUGATTI-DOWTY, Velizy Villacoublay (FR)

(72) Inventor: Norbert Lartigue, Le Plessis-Robinson (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 465 days.

(21) Appl. No.: 15/149,657

(22) Filed: May 9, 2016

(65) Prior Publication Data

US 2016/0333988 A1 Nov. 17, 2016

(30) Foreign Application Priority Data

May 12, 2015 (FR) ...................... 15 54274

(51) Int. Cl.
*F16H 13/04* (2006.01)
*B64C 25/40* (2006.01)
*F16H 55/32* (2006.01)

(52) U.S. Cl.
CPC ........... *F16H 13/04* (2013.01); *B64C 25/405* (2013.01); *F16H 55/32* (2013.01); *Y02T 50/823* (2013.01)

(58) Field of Classification Search
CPC ........ F16H 13/04; F16H 55/32; B64C 25/405
See application file for complete search history.

(56) References Cited

U.S. PATENT DOCUMENTS

| | | | | |
|---|---|---|---|---|
| 3,023,593 A | * | 3/1962 | Nallinger | F16D 3/50 139/326 |
| 3,165,945 A | * | 1/1965 | Magrum | F16F 1/362 464/68.91 |
| 4,646,899 A | * | 3/1987 | Murakami | F16D 3/52 192/209 |
| 4,734,079 A | * | 3/1988 | Viets | F16D 3/2055 188/379 |
| 4,734,080 A | * | 3/1988 | Kronert | F16D 3/80 464/26 |
| 4,764,152 A | * | 8/1988 | Jorg | F16D 3/76 464/87 |
| 4,921,470 A | * | 5/1990 | Kotani | F16D 3/46 464/147 |
| 5,205,788 A | * | 4/1993 | Sacher | B63H 23/32 464/160 |
| 5,240,457 A | * | 8/1993 | Leichliter | F16H 45/02 192/208 |
| 5,931,052 A | * | 8/1999 | Zhao | F16F 15/315 123/192.1 |
| 6,062,103 A | * | 5/2000 | Soares | F16F 15/13142 192/214 |
| 6,547,612 B1 | * | 4/2003 | Bader | B63H 23/00 440/75 |
| 6,837,345 B1 | * | 1/2005 | Lauble | F16F 1/371 188/378 |

(Continued)

*Primary Examiner* — David M Fenstermacher
(74) *Attorney, Agent, or Firm* — Sughrue Mion, PLLC

(57) ABSTRACT

A roller (1) having a rigid reinforcement (4) defining a hub (5) for rotation of the roller about an axis of rotation X and a plurality of bars (6) regularly arranged around the hub (5) and extending parallel to the axis X. The roller further has bushings (10), each engaged on a respective one of the bars (6) and each comprising an outer rigid ring (11) surrounding a bushing body (12) made of deformable material.

14 Claims, 3 Drawing Sheets

(56) References Cited

U.S. PATENT DOCUMENTS

| | | | |
|---|---|---|---|
| 7,445,242 B2* | 11/2008 | Yamaguchi | B62D 1/16 280/779 |
| 2010/0230022 A1* | 9/2010 | Kim | B60C 7/102 152/310 |
| 2016/0195160 A1* | 7/2016 | Leinfelder | F16F 15/1442 464/87 |

* cited by examiner

DRIVE ROLLER

The invention relates to a drive roller, e.g. for driving rotation of a wheel of a vehicle such as an aircraft.

BACKGROUND OF THE INVENTION

Several reasons are causing aircraft manufacturers to try motorizing aircraft wheels, in particular by using drive actuators having electric motors. Such motorization presents significant environmental and economic advantages (reduction in fuel consumption, reduction of noise during taxiing, etc.), and makes it possible to perform new functions: moving the aircraft while its propulsion engines are not operating, taxiing in reverse, remotely controlling the aircraft while it is on the ground, etc.

Designers and systems integrators have studied numerous architectures for actuators for driving aircraft landing gear wheels.

In a first type of architecture, an actuator for driving a wheel in rotation comprises a brushless electric motor, a stepdown gearbox having two reduction stages, a clutch device, and a third stepdown stage driving the wheel in rotation tangentially via connecting rods. In that type of architecture, a relatively large number of parts are permanently connected to the wheel and are subjected to the same mechanical stresses as the wheel (acceleration, vibration, impacts, etc.), thereby raising difficulties of reliability of operation for the drive actuator, and more generally for the function of driving the wheel as performed by the actuator.

In a second type of architecture, the clutch device is replaced by the action of the connecting rods that couple and uncouple the stepdown gearbox and the wheel. That type of architecture is mechanically complex and not very robust. Furthermore, inaccurate positioning of the connecting rods, in particular when coupling at speed when the landing gear and the wheel are deformed, makes it necessary to use coupling rods that are voluminous and thus difficult to integrate between the wheel and the landing gear leg.

In a third type of architecture, the actuator comprises a brushless electric motor, a reduction unit comprising a gearbox and a pinion connected to the outlet of the stepdown gearbox, the pinion meshing with a toothed ring fastened on a rim of the wheel. The actuator is engaged and disengaged relative to the wheel by moving the stepdown unit radially closer to or further away therefrom, thereby enabling the pinion to mesh with the toothed ring or to be separated therefrom. That architecture presents oscillations in the transmission of torque, thereby reducing the lifetime of the drive train.

In order to remedy the above-described drawbacks, proposals have been made to use a drive actuator architecture involving one or more friction rollers associated with means for pressing the friction rollers against the wheel or against a slip track (or ring) mounted on a rim of the wheel in order to cause the wheel to turn. The designs of the drive actuator and of the drive roller itself need to comply with particularly strict requirements applicable to equipment mounted at the bottom of landing gear, where integration of the equipment must be robust in the face of the relatively large amounts of deformation to which wheel rims in particular are subjected, and that equipment must withstand particularly high levels of impact and vibration on landing and while braking after landing.

OBJECT OF THE INVENTION

An object of the invention is to provide a drive roller that is suitable for driving an aircraft wheel in rotation in spite of the relative movements to which the roller and the wheel rim are subjected, and that is mechanically robust so as to present a lifetime that is sufficient.

SUMMARY OF THE INVENTION

In order to achieve this object, there is provided a drive wheel comprising:
  rigid reinforcement defining a hub for rotation of the roller about an axis of rotation X and a plurality of bars regularly arranged around the hub and extending parallel to the axis X; and
  bushings, each engaged on a respective one of the bars and each comprising an outer rigid ring surrounding a bushing body made of deformable material.

The drive roller is advantageously for co-operating with a rigid running track presenting undulations and mounted on a rim of an aircraft landing gear wheel.

The bushing bodies made of deformable material serve to compensate the relative movements and misalignments between the drive roller and the running track.

The fixed bars of the rigid reinforcement, the outer rigid rings, and the deformable bushing bodies in combination make it possible to transmit a fraction of the torque by co-operation with the undulations of the running track, with the remainder of the torque being transmitted by friction. This reduces the radial force that needs to be developed on the drive roller for transmitting a given torque. The compression of the deformable bushing bodies also makes it possible to increase the contact area between the drive roller and the running track while making stresses over the contact area more uniform, and further reducing local stresses within the drive roller. Reducing these stresses and making them more uniform serve to make the drive roller more robust and give it a longer lifetime, since the material is locally stressed less severely.

The invention also proposes a drive system for driving a wheel in rotation, the drive system comprising one or more drive rollers as described above and a running track mounted on the wheel, the running track presenting obstacles in the form of undulations.

BRIEF DESCRIPTION OF THE DRAWINGS

The invention can be better understood in the light of the following description made with reference to the figures of the accompanying drawings, in which.

DETAILED DESCRIPTION OF THE INVENTION

With reference to FIGS. 1 to 4, the drive roller 1 of the invention co-operates in this example with a rigid running track 2 to form a system for driving an aircraft landing gear wheel in rotation.

The rigid running track 2 constitutes a ring mounted coaxially with the wheel on an inside face of a rim of the wheel, said inside face of the rim facing a leg of the aircraft landing gear when the wheel is mounted at the bottom of the landing gear.

Figure 1:
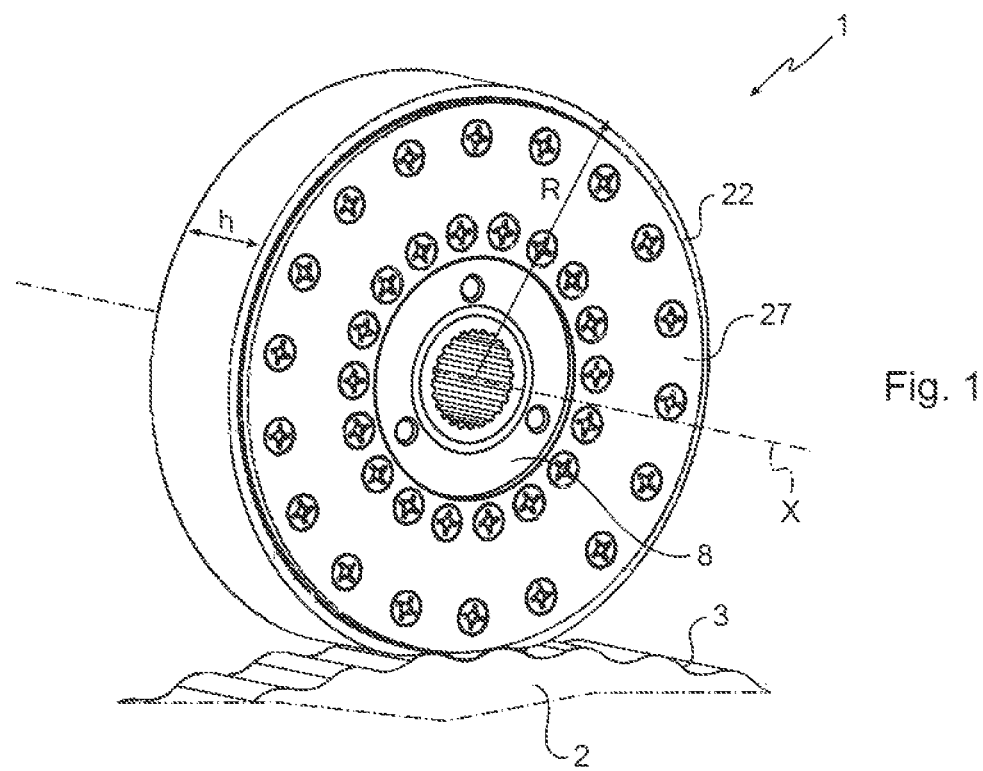
FIG. 1 is a perspective view of a drive roller of the invention in a position engaged with a running track mounted on a wheel rim.
Figure 2:
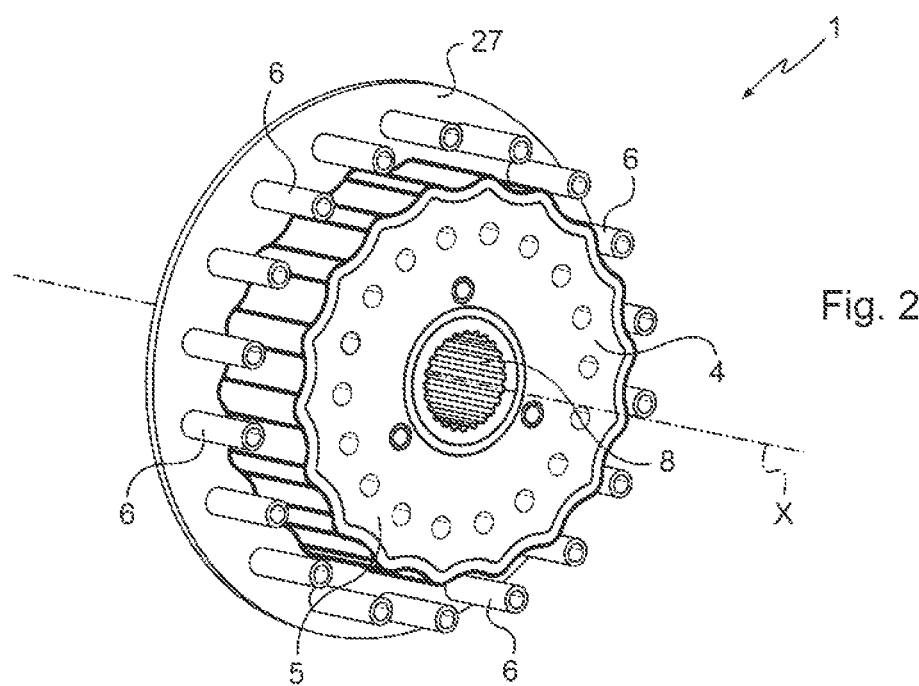
FIG. 2 is a perspective view of the drive roller of the invention, from which a tread, bushings, a lateral flank, and a roller body have been removed in order to reveal the rigid reinforcement of the roller.
Figure 3:
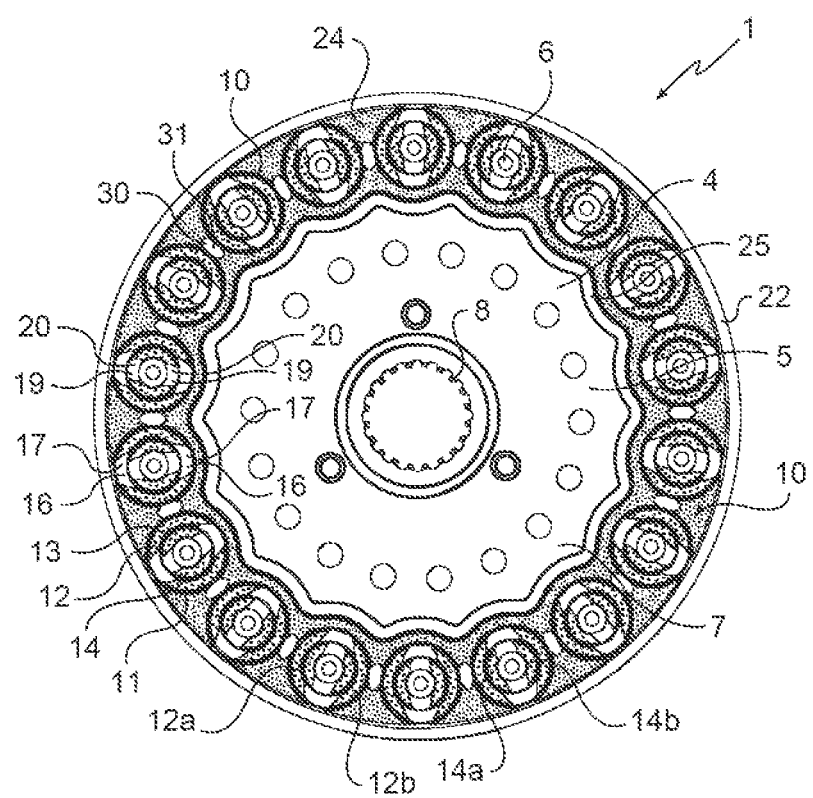
FIG. 3 is a face view of the FIG. 1 roller, with a lateral flank of the roller removed in order to reveal the inside of the drive roller.
Figure 4:
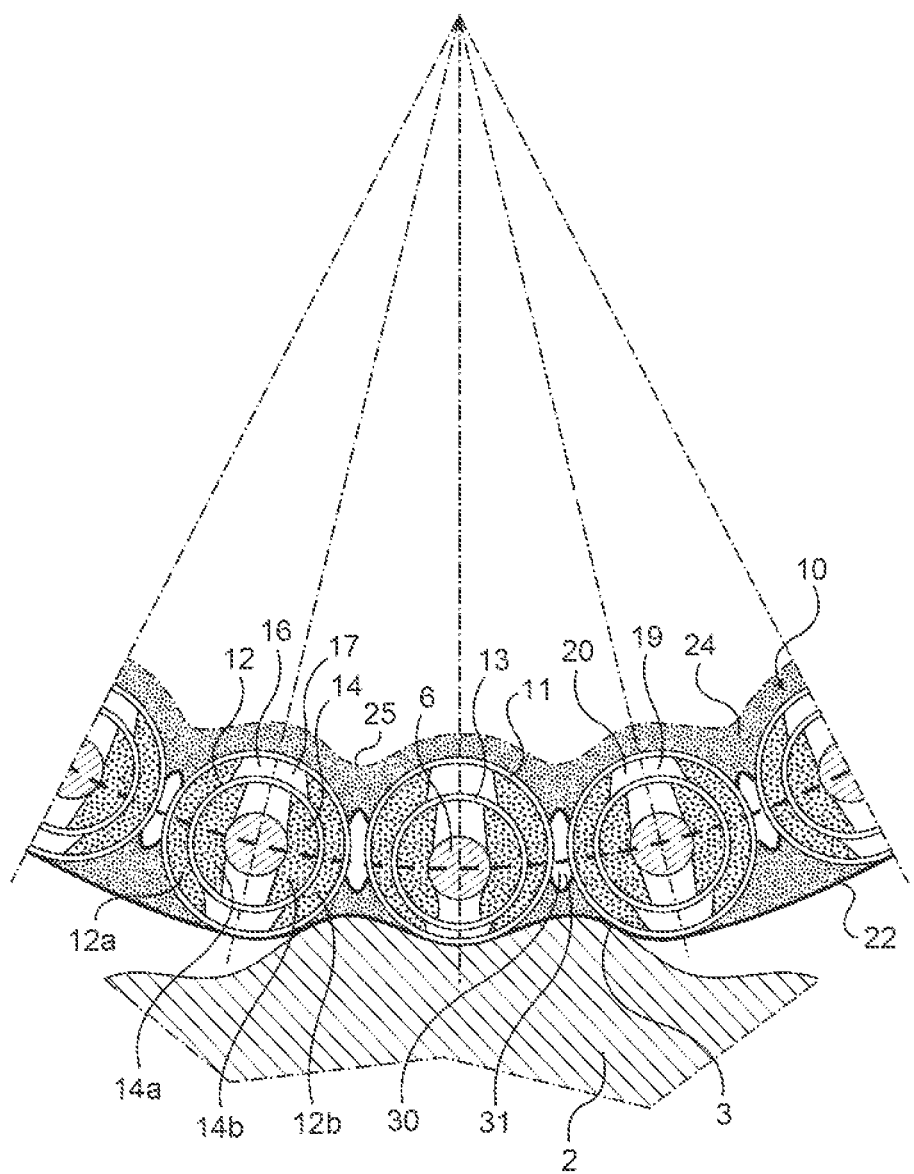
FIG. 4 is a fragmentary face view of the inside of the roller in the engaged position while a radial force is being applied on the roller.

The drive roller 1, when positioned in an engaged position as shown in FIGS. 1 and 4, co-operates with obstacles formed on the running track 2, which obstacles are constituted by undulations 3 extending on a circumference of the running track 2 in this example.

At rest, the drive roller 1 presents an outside shape that is generally in the form of a closed cylinder about an axis X, of height h and of outside radius R. The height h is preferably less than the outside radius R, thereby giving the drive roller 1 a flat shape.

The drive roller 1 comprises firstly rigid reinforcement 4 that defines a central hub 5 for rotating the drive roller 1 about the axis of rotation X, and a plurality of bars 6 that are regularly arranged around the central hub 5, extending parallel to the axis X. In this example, the rigid reinforcement 4 is a part made of metal.

The central hub 5 has a main portion 7. The main portion 7 is of generally tubular shape about the axis X and of height h, but it nevertheless presents longitudinal undulations at its periphery. Inside the main portion 7 of the central hub 5 there is incorporated a fluted female socket 8. This fluted female socket 8 is for receiving a drive shaft, itself connected to a stepdown device for driving the drive roller 1 in rotation, so as to transmit drive torque to the wheel, and drive the wheel in rotation.

The drive roller 1 also has bushings 10, each engaged on a respective one of the bars 6 of the rigid reinforcement 4.

Each bushing 10 comprises an outer rigid ring 11, made of metal in this example. Each outer rigid ring 11 surrounds a deformable bushing body 12 made of deformable material. The deformable material of the bushing bodies 12 is adapted to withstand high levels of compression. The deformable material of the bushing bodies 12 is an elastomer material in this example.

Each bushing 10 also has a rigid cylindrical insert 13, which is made of metal in this example, that is engaged on the bar 6 associated with the bushing 10. Each rigid cylindrical insert 13 is connected to the associated bar 6 by a deformable insert body 14 made of deformable material. In this example, the deformable material of the insert body 14 is identical to the material of the bushing bodies 12.

Each bushing body 12 is subdivided into two half-bodies 12a, 12b that are arranged circumferentially on either side of the associated rigid cylindrical insert 13 (and thus on either side of the associated bar 6), thereby defining two first cavities 16 radially on either side of the associated bar 6.

A first deformable cavity body 17 made of deformable material occupies each first cavity 16. The deformable material of the first cavity body 17 is less rigid than the deformable material of the bushing body 12.

Likewise, each insert body 14 is subdivided into two half-bodies 14a, 14b that are arranged circumferentially one either side of the associated bar 6, thereby defining two second cavities 19 radially on either side of the associated bar 6.

A second deformable cavity body 20 made of deformable material with little rigidity extends in each second cavity 19. The deformable material of the second cavity body 20 in this example is the same as the deformable material of the first cavity body 17.

A deformable band 22 extends around the bushings 10 over a circumference of the drive roller 1 in order to define a tread of the drive roller 1.

The deformable band 22 is constituted by a thin layer of polymer material reinforced by a web of woven metal fabric embedded in the polymer material.

The thin layer of polymer material serves to accommodate defects, if any, in the positioning of the running track 2, and to expel any liquid elements or pollutants that might be found on the running track 2 after being pressed against the running track 2 by the radial load applied on the running track 2 by the drive roller 1. The reinforcement by the web of woven wires serves to reinforce the circumferential stiffness of the drive roller. This enables the drive roller 1 to accommodate larger radial and tangential stresses.

A deformable roller body 24 made of deformable material occupies the space between the central hub 5 and the deformable band 22, and encompassing the bushings 10. The deformable material of the roller body 24 in this example is the same as the deformable material of the bushing body 12, however it could have different characteristics (including stiffness).

The roller body 24 and the central hub 5 are separated by a diaphragm 25 constituted by a thin layer of polymer material reinforced by a web of woven wires embedded in the polymer material. The polymer material is the same as that used for the deformable band 22. The diaphragm 25 is of undulating shape in register with the undulations of the main portion 7 of the central hub 5.

The rigid reinforcement 4 of the drive roller 1 also has lateral flanks 27, metal flanks in this example. The lateral flanks 27 are fastened to the central hub 5. Each bar 6 has a first end fastened to one of the lateral flanks 27 and a second end fastened to the other lateral flanks 27. The lateral flanks 27 are for preventing the deformable material forming the roller body 24 from expanding axially along the axis X and for increasing the stiffness of the drive roller 1 in compression. The lateral flanks 27 transmit torque to the bars 6 and to the central hub 5. The outer rigid rings 11 of the bushings 10 are radially movable relative to the bars 6 of the rigid reinforcement 4, thus enabling the deformable material of the roller body 24 to move in the proximity of the bushings 10, thereby enabling the periphery of the drive roller 1 to adapt to the shapes and the movements of the running track 2. It should be observed that the movement of the bushings 10 is contained by the deformable band 22 so as to avoid heating and premature aging of the deformable material of the roller body 24 in zones in the proximity of the bushings 10.

The outer rigid rings 11, the rigid cylindrical inserts 13, and the bushing bodies 12 in combination enable a fraction of the torque to be transmitted by friction and another fraction by meshing, by the radial force being converted into tangential force as a result of the interference that is obtained between the undulations 3 of the running track 2 and the deformable material of the roller body 24 as compressed between the undulations 3. The compression of the deformable material of the roller body 24 also serves to increase the area of contact between the drive roller 1 and the running track 2.

The structure of the drive roller 1 also makes it possible to create stiffness in the drive roller 1 that is anisotropic between the radial and tangential directions.

The bushing bodies 12 and the insert bodies 14 are constituted by relatively thin layers of deformable material. These relatively thin layers accept high internal stresses tangentially because they are confined in constricted volumes, and thus because of the large tangential stiffness of the deformable materials. The transmission of torque and of tangential force is thus improved inside the drive roller 1.

In contrast, the deformable material of low rigidly filling the first cavities 16 and the second cavities 19 allows radial movement to be relatively large between the outer rigid rings 11 and the rigid cylindrical insert 13 under the effect of a radial force applied to the drive roller 1, because of the low stiffness of the drive roller 1 in this radial direction. Under the effect of a radial force, the outer rigid rings 11 and the rigid cylindrical insert 13 rise towards the central hub 5, thereby generating a plane interface with the running track 2 at the contact between the drive roller 1 and the running track 2.

Thus, when the bushing 10 in the radial position of the track 2 is compressed under the effect of the radial force, the bushing shifts towards the center of the drive roller 1. As a result, the adjacent bushings are pushed (in part) radially towards the outside of the drive roller 1 so as to project therefrom because of the deformation/compression of the incompressible deformable material at the outside of the central hub 5. This phenomenon thus increases the area of contact between the roller and the track by spreading the roller along the track.

The area of contact between the drive roller 1 and the running track 2 is thus increased, as is the number of outer rigid rings 11 of bushings 10 that come into contact with the running track 2 via the deformable band 22. This serves to optimize the transmission of torque by meshing. In addition, radial flexibility is conferred on the structure of the drive roller 1, which radial flexibility encourages matching the drive roller 1 to the deformations of the running track 2.

Third cavities 30 are also formed in the roller body 24 between adjacent bushings 10. A third deformable cavity body 31 made of deformable material having little rigidity occupies each third cavity 30. In this example, the deformable material with little rigidity of the third cavity bodies 31 is the same as the material of the first cavity bodies 17. The third cavities enable the outer rigid rings 11 of the bushings 10 to move radially without harming the deformable material of the deformable roller body 24. This avoids a thin layer of deformable material of the deformable roller body 24 being formed that would be subjected to high levels of shear stress that would be harmful for the deformable material of the deformable roller body 24. The outer rigid rings 11 of the bushings 10 are relatively close together and can thus come into contact with one another while preserving the large stiffness necessary for transmitting the tangential force produced by the torque, without limiting their radial movements.

Advantageously, the annular pitch of the bushings 10 corresponds to the pitch of the undulations 3 of the running track 2.

Advantageously, the number of undulations of the running track 2 in contact with the drive roller 1 is not less than two in order to ensure good transmission of the torque. The greater the number of undulations in contact under the drive roller 1, the larger the fraction of the torque that is transmitted by meshing (for given torque), and thus the greater the efficiency with which torque is transmitted.

It should be observed that, in the event of one of the bushings 10 failing, the structure of the drive roller of the invention makes it possible to replace the bushing 10 individually without it being necessary to replace the entire roller.

The invention is not limited to the particular embodiment described, but on the contrary covers any variant coming within the ambit of the invention as defined by the claims.

Although it is stated that the deformable band in this example is formed by a thin layer of polymer reinforced by a web of woven metal wires embedded in elastomer material, the deformable band could be fabricated with any type of deformable material, and in particular it could be fabricated in full or in part with any type of woven fabric optionally including yarns that are not made of metal.

Although it is stated that the flanks are made of metal, they could perfectly well be made using one or more other materials: composite material, etc.

Although it is stated that the deformable materials of the roller body, of the bushing bodies, and of the insert bodies are identical, it is perfectly possible to use different deformable materials. This also applies for the deformable materials of the first cavity bodies, the second cavity bodies, and the third cavity bodies.

Furthermore, although the first, second, and third cavities are described as each being filled with a deformable material of little rigidity, they could also be empty, filled with air, etc.

The deformable materials mentioned need not necessarily be elastomers.

Although it is stated that the main portion 7 presents longitudinal undulations at its periphery, it is perfectly possible to provide a main portion of some other shape, and in particular of cylindrical shape without undulations.

Although it is stated that the running track has undulations, it could perfectly well be smooth, or indeed rough but without undulations.

Although a system is described that comprises one roller and one track, the invention could naturally be implemented by associating a plurality of rollers with a single track.

The invention claimed is:

1. A drive roller (1) comprising:
    a rigid reinforcement (4) defining a hub (5) for rotation of the roller about an axis of rotation X and a plurality of bars (6) regularly arranged around the hub (5) and extending parallel to the axis X; and
    bushings (10), each engaged on a respective one of the bars (6) and each comprising an outer rigid ring (11) surrounding a bushing body (12) made of deformable material.

2. The roller according to claim 1, including a deformable band (22) extending around the bushings in order to define a tread for the roller.

3. The roller according to claim 2, including a roller body (24) made of deformable material extending in the space between the hub and the deformable band and encompassing the bushings.

4. The roller according to claim 1, wherein the rigid reinforcement (4) further includes two lateral flanks (27) fastened to the hub (5), each end of each bar (6) being fastened to one of the lateral flanks.

5. A drive system for driving a wheel in rotation, the drive system comprising at least one drive roller (1) according to claim 1 and a running track (2) mounted on the wheel, the running track presenting obstacles in the form of undulations (3).

6. The drive system according to claim 5, wherein a pitch of the bushings corresponds to a pitch of the undulations.

7. A drive roller (1) comprising:
    a rigid reinforcement (4) defining a hub (5) for rotation of the roller about an axis of rotation X and a plurality of bars (6) regularly arranged around the hub (5) and extending parallel to the axis X; and bushings (10), each engaged on a respective one of the bars (6) and each comprising an outer rigid ring (11) surrounding a bushing body (12) made of deformable material, wherein the bushing body (12) is subdivided into two half-bodies (12a, 12b) arranged circumferentially on either side of the associated bar (6) and defining two first cavities (16) radially on either side of the associated bar (6).

8. The roller according to claim 7, wherein a first cavity body (17) of deformable material extends in each first cavity (16), the deformable material of the first cavity body being less rigid than the material of the bushing body (12).

9. A drive roller (1) comprising:
a rigid reinforcement (4) defining a hub (5) for rotation of the roller about an axis of rotation X and a plurality of bars (6) regularly arranged around the hub (5) and extending parallel to the axis X; and
bushings (10), each engaged on a respective one of the bars (6) and each comprising an outer rigid ring (11) surrounding a bushing body (12) made of deformable material,
wherein each bushing further includes a rigid cylindrical insert (13), each rigid cylindrical insert being connected to the associated bar by an insert body (14) of deformable material.

10. The roller according to claim 9, wherein each insert body is subdivided into two half-bodies (14a, 14b) arranged circumferentially on either side of the associated bar (6) and defining two second cavities (19) radially on either side of the associated bar.

11. The roller according to claim 10, wherein a second cavity body (20) of deformable material extends in each second cavity, the deformable material of the second cavity body being less rigid than the material of the bushing body.

12. The roller according to claim 9, wherein cavities (30) are formed between adjacent bushings.

13. The roller according to claim 12, wherein a cavity body (31) of deformable material extends in each cavity, the deformable material of the cavity bodies being less rigid than the material of the bushing bodies.

14. The roller according to claim 12, wherein the cavities (30) do not contain any material.

* * * * *